United States Patent
Alton (10) Patent No.: US 7,012,993 B2
(45) Date of Patent: Mar. 14, 2006

(54) TELECOMMUNICATIONS MODEM DEACTIVATION CONTROL METHOD AND APPARATUS

(75) Inventor: Ronald Frank Alton, Oceanside, CA (US)

(73) Assignee: Denso Corporation, Kariya (JP)

( * ) Notice: Subject to any disclaimer, the term of this patent is extended or adjusted under 35 U.S.C. 154(b) by 728 days.

(21) Appl. No.: 10/117,247

(22) Filed: Apr. 5, 2002

(65) Prior Publication Data
US 2003/0190030 A1    Oct. 9, 2003

(51) Int. Cl.
*H04M 3/22* (2006.01)
(52) U.S. Cl. ................... 379/26.01; 379/29.01
(58) Field of Classification Search ........... 379/219; 455/404.1, 404.2; 701/207, 210, 211
See application file for complete search history.

(56) References Cited

U.S. PATENT DOCUMENTS

| | | | |
|---|---|---|---|
| RE34,034 E | 8/1992 | O'Sullivan | |
| 6,337,621 B1 * | 1/2002 | Ogino et al. | 340/425.5 |
| 6,462,706 B1 * | 10/2002 | Decker | 342/357.02 |
| 6,493,629 B1 * | 12/2002 | Van Bosch | 701/207 |
| 6,675,006 B1 * | 1/2004 | Diaz et al. | 455/404.1 |
| 6,738,914 B1 * | 5/2004 | Christopher | 713/323 |
| 6,871,067 B1 * | 3/2005 | Clark et al. | 455/428 |

* cited by examiner

*Primary Examiner*—Bing Q. Bui
(74) *Attorney, Agent, or Firm*—Morrison & Foerster LLP (57) ABSTRACT

A method is disclosed for controlling the deactivation of a telecommunications modem based on the call type, independent of the connection quality, to minimize power consumption. The present invention is particularly useful in mobile applications when the vehicle's ignition is off and power resources are limited. Telematics control units (TCUs), installed in mobile vehicles, communicate with a service provider through a cellular communication network to provide telematics functionality for the vehicles. In one embodiment, the service provider sends a message which triggers the TCU to place a maintenance call to the service provider. During the maintenance call messaging, the TCU identifies a particular call type of the maintenance call. For any of the possible maintenance call types, the TCU will have stored in advance an allowed execution time for that call type. The TCU will set a call timer to the allowed execution time for that call type. When the allowed execution time has elapsed, the connection will be dropped and the modem will be turned off, regardless of whether the maintenance call was completed.

57 Claims, 4 Drawing Sheets

T1 - Default call timer starts. This timer expires at T2.
T2 - Start of Maintenance call data transmission. Data requires T2 to T3 to complete.
T3 - Buffer to complete data transmission if some data is lost.
T4 - Modem is deactivated.

FIG. 6

TELECOMMUNICATIONS MODEM DEACTIVATION CONTROL METHOD AND APPARATUS

BACKGROUND OF THE INVENTION

1. Field of the Invention

The present invention relates, generally, to telecommunications modems and, in one embodiment, to a method and apparatus for controlling the deactivation of a telecommunications modem to minimize power consumption.

2. Description of Related Art

Cellular communication networks are rapidly becoming a primary infrastructure for enabling communication in today's society. As demand for cellular communications has increased, cellular communication networks have become increasingly prevalent and are providing coverage over larger areas. Rather than just providing a means for voice communications such as personal or business telephone calls, cellular communication networks are now being used for transmitting data and emergency communications. Mobile communications technology has been extended to include mobile communication devices, identified herein as telematics control units (TCUs), installed in vehicles such as automobiles, boats, and the like.

As with a cellular telephone, these TCUs communicate with base stations/sectors in a cellular communication network to provide telematics functionality for the vehicles, which may include, but is not limited to, vehicle tracking and positioning, on-line navigation, emergency "roadside" assistance, remote engine diagnostics, tracking stolen vehicles, entertainment, information services, Internet and e-mail access, automatic emergency transmissions when an accident has occurred, remote door unlocking, telephone and voicemail service, traffic reports, and the like. This telematics functionality is typically provided by a service provider center connected to the TCU through the cellular communication network.

Figure 1:
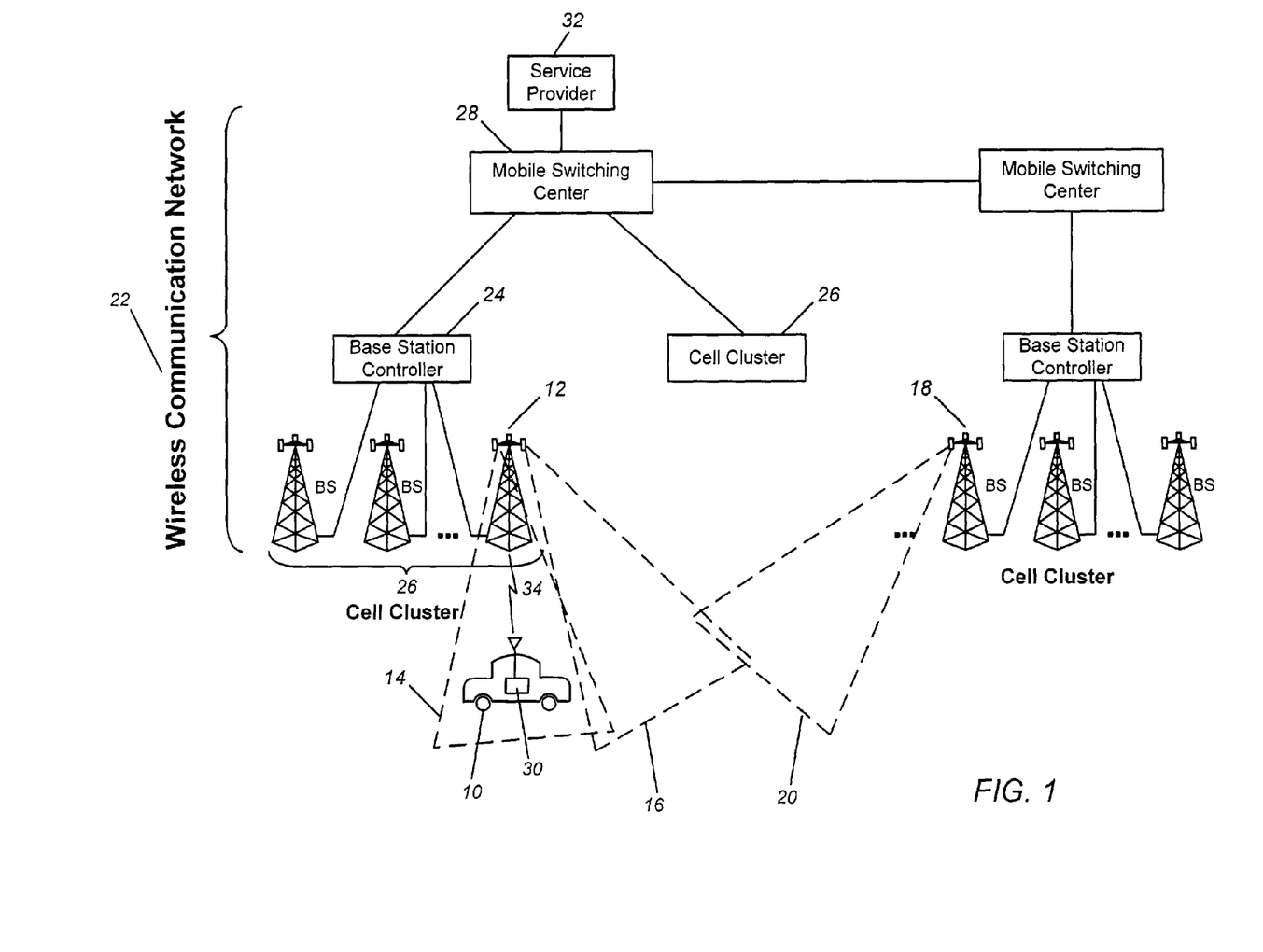
FIG. 1 illustrates an example system environment with a vehicle having a telematics control unit moving between different sectors in a wireless communication system.

FIG. 1 illustrates an example of a vehicle 10 having a TCU 30 capable of maintaining a connection 34 with a cellular communication network 22 as the vehicle 10 roves through a geographic area served by the cellular communication network 22, or remains stationary at some geographic location within the network 22. It should be understood that a connection, as referred to herein, includes, but is not limited to, voice, multimedia video or audio streaming, packet switched data and circuit switched data connections, short message sequences or data bursts, and paging. The cellular communication network 22 includes a first base station (BS) 12 communicating over sectors 14 and 16, and a second BS 18 communicating over sector 20. A BS is typically comprised of multiple sectors, usually three. Each BS includes a separate transmitter and antenna (transceiver) for each sector, pointed in the direction of the sector. Because a BS can be omni or sectorized, it should be understood that the terms BS and sector may be used interchangeably herein. The BSs are connected to network infrastructure entities including BS controllers (BSC) 24 that may control a cell cluster 26, and communicate with a mobile switching center (MSC) 28. It should be understood that one or more of these network infrastructure entities contain one or more processors for controlling the cellular communications between the TCU 30 and the network 22. The processors include memory and other peripheral devices well understood by those skilled in the art. In addition, a service provider 32 is connected to the mobile switching center 28 for communicating with the TCU 30 through the network 22. Although the service provider 32 is shown as a single block in FIG. 1, it should be understood that the service provider 32 may actually comprise a telematics service system of multiple service centers distributed throughout various geographic areas and networks. The service provider 32 contains one or more telematics system processors for controlling communications with the TCU 30 through the network 22.

Figure 2:
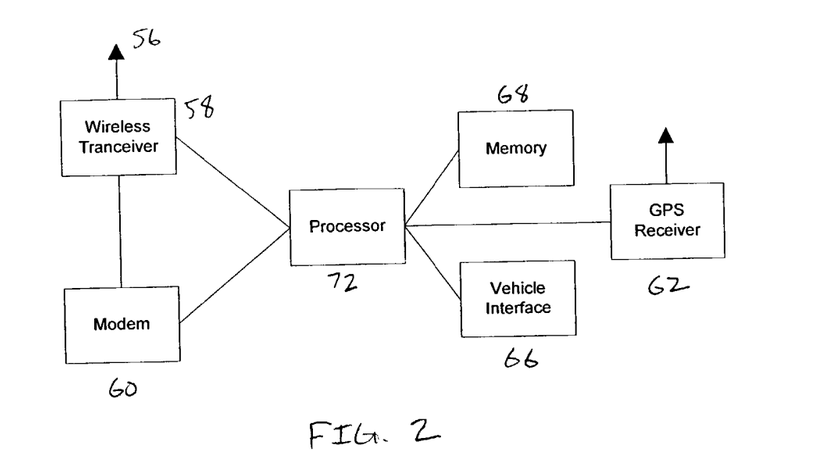
FIG. 2 illustrates a block diagram of an exemplary telematics control unit.

As illustrated in the example of FIG. 2, the TCU 30 may include a processor 72, memory 68, antenna 56, TCU transceiver 58, modem 60, Global Positioning System (GPS) receiver 62, and a vehicle interface 66 for controlling vehicle functions such as the door locks, the sound system, and the like. The TCU transceiver may be configured to be compatible with one of more of the following communication protocols: GSM, CDMA, TCS, AMPS, TDMA, FDMA, CDMA, and the like. Although the processor 72 and memory 68 are shown in FIG. 4 in separate blocks, it should be understood that references to TCU herein generally include different types of configurations for processors, memory and other peripheral devices not shown in FIG. 2 but well understood by those skilled in the art.

The TCU 30 and the network communicate using channels. Information in these channels is modulated and demodulated by the modem 22 in accordance with a particular coding scheme or type of cellular communication service. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window.

Code division multiple access (CDMA) is a technique for spread-spectrum multiple-access digital communications that creates channels through the use of unique code sequences. It allows a number of TCUs to communicate with one or more BSs, simultaneously using the same frequency. In CDMA, given a space of frequency and time, each channel is assigned a particular orthogonal code such as a Walsh code or a quasi-orthogonal function (QOF). In direct sequence CDMA, the data from each channel is coded using Walsh codes or QOFs and then combined into a composite signal. This composite signal is spread over a wide frequency range at a particular time. When this composite signal is de-spread using the same code used to spread the original data, the original data may be extracted. This recovery of the original data is possible because Walsh codes and QOFs create coded data that, when combined, do not interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other TCUs and cellular communication devices in the same or other cell sites, as well as self-interference or noise generated at the TCU. However, noise and interference in the field may require error correction to determine what was actually transmitted.

The CDMA wireless communication system is fully described by the following standards, all of which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95A, published in 1993; TIA/EIA-95B, published Feb. 1, 1999; TIA/EIA/IS-2000, Volumes 1–5, Release A, published Mar. 1, 2000; TIA/EIA-98D, published Jun. 1, 2001; and WCDMA standards 3GPP TS 25.214 V4.2.0 published September 2001, TS25.401 V5.1.0 published September 2001, TS 25.331 V4.2.0 published Oct. 8, 2001, and TR 25.922 V4.1.0 published Oct. 2, 2001.

Figure 3:
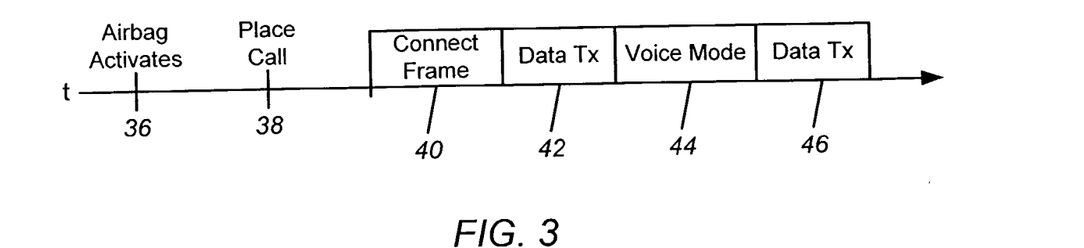
FIG. 3 illustrates a timing diagram of an exemplary emergency communication sequence during an "ignition-on" mode.

As noted above, one possible function of the communications available between the service provider and the TCU is to provide emergency "roadside" assistance and automatic emergency transmissions when an accident has occurred. For example, if a vehicle is involved in an accident while the ignition is on and the airbag activates, indicated at time 36 in FIG. 3, the TCU in the vehicle will automatically turn on its modem and initiate a connection session with the network 22 at time 38. Upon successful establishment of the connection, the service provider will attempt to communicate with the TCU by transmitting a connect frame 40. If this connect frame 40 is properly received, the TCU will respond with a data transmission 42 that may include position data from the TCU's GPS device, the vehicle identification number (VID), and other information. This data is provided by the TCU automatically, without need for involvement by the vehicle's occupants, to ensure basic information can be received by the service provider even if the occupants are unable to respond. After receiving the data, the service provider may then transition to voice mode 44, where an attempt will be made by a service provider representative to communicate with the occupants of the vehicle. At a later time, additional data transmissions 46 can be transmitted to the service center, either at preset intervals or upon request by the service center, containing information such as a position update or remote engine diagnostics.

The above-described communication sequence is considered to be an "ignition-on" mode, because the ignition of the vehicle was on at the time the airbag was activated and the emergency communication sequence was initiated. The "ignition-on" designation is preserved even if the vehicle's ignition is shut off as a result of the accident. Typically, whenever the ignition is on, the modem can remain on indefinitely, because there are no power resource issues. When an accident has occurred and a sudden loss of the ignition switch occurs, the modem remains on, listening for connect frames 40 to improve safety.

Communications between the service provider and the TCU may also occur when the ignition is off ("ignition-off" mode). For example, if a person has locked the vehicle's keys inside the vehicle, that person can telephone the service provider, which will initiate a communication to the TCU in the vehicle to unlock the vehicle doors. Other tasks, such as downloading a phone book or updating a preferred roaming list, may also be performed while the vehicle's ignition is off. These ignition-off tasks typically require data transmissions between the service provider and the TCU, and are referred to herein as maintenance calls. Maintenance calls may be triggered by the service provider in the form of a communication such as a short message service (SMS) message transmitted to the TCU. Upon receipt of the SMS message, the TCU can then place a maintenance call to the service provider. Once a connection is established, the TCU and service provider can transmit data and instructions, as necessary, to process the maintenance call and perform the desired maintenance task. Alternatively, the service provider may place a maintenance call directly to the TCU. Maintenance calls may also be triggered by the TCU in the form of an SMS message transmitted to the service provider. Upon receipt of the SMS message, the service provider can then place a maintenance call to the TCU. Alternatively, the TCU may place a maintenance call directly to the service provider. Other protocols may also be employed to place maintenance calls.

Figure 4:
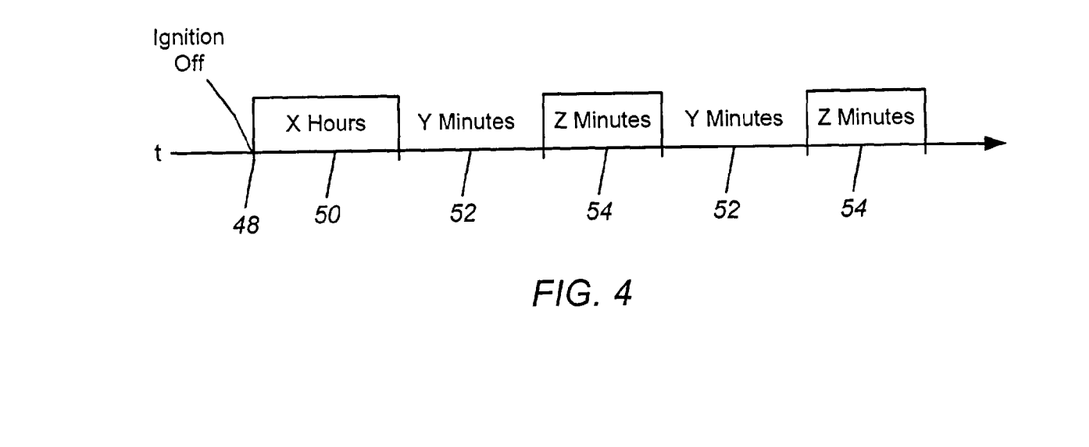
FIG. 4 illustrates a timing diagram of an exemplary telematics control unit transceiver activation sequence during an "ignition-off" mode.

The TCU cannot receive nor transmit any messages or calls except during the time that the TCU's cellular transceiver is activated. In the ignition-off mode, the cellular transceiver in the TCU is periodically activated. While active, the transceiver attempts to receive any communications being transmitted by the service provider to the TCU, such as an SMS message directing the TCU to place a maintenance call, or a maintenance call transmitted directly from the service provider. All other components of the TCU remain off, including the modem, to prevent excessive battery drain. One example of the periodic activation of the transceiver is illustrated in FIG. 4. When the ignition is turned off at time 48, the cellular transceiver will stay active (on) for an extended listening period of X hours (see reference character 50), then turn off for Y minutes (see reference character 52), then turn on again for a short listening period of Z minutes (see reference character 54). The Y-Z pattern is then repeated. Note that Y is generally much longer than Z. The repeating Y-Z pattern will continue for a fixed time period such as a predetermined number of days, but if the ignition is not turned on during that time period, the pattern will cease, and the transceiver will not be activated again unless the ignition is first started.

The extended listening period 50 can be considered an override of the typical repeating Y-Z pattern and is provided for customer convenience. For example, if the driver has left the vehicle for an hour, realizes the keys are locked in the vehicle, and notifies the service provider, it would be inconvenient for the driver to have to wait up to Y minutes before the transceiver is activated again and is able to receive a service center SMS message instructing the TCU to place a maintenance call to the service provider to unlock the doors. The repeating Y-Z pattern of transceiver activation is provided to minimize consumption of the vehicle's power budget allocated to the TCU, while still providing periodic opportunities for the TCU to receive communications from the service provider. For example, maintenance calls initiated by the service provider via an SMS message during off-peak hours need not be attended to immediately, so the SMS message can be repeatedly transmitted by the service provider at intervals less than Z minutes to ensure that they will be received by the TCU's transceiver during one of the short listening periods 54.

During the time periods in which the transceiver is active, the service provider may communicate with the TCU in several ways. As described above, the TCU can receive an SMS message from the service provider through the network, instructing the TCU to place a maintenance call. Alternatively, the TCU can receive a callback sequence from the service provider through the network, instructing the TCU to place a maintenance call. A callback sequence is the receipt of two incoming calls within a specified time period. The reason for having these two methods is that in an AMPS network, SMS service is not fully supported across the desired service area, so a callback sequence must be sent. In either case, the TCU will respond by turning on its modem and initiating a connection request back to the service provider to place the maintenance call.

Upon establishment of the connection, data may be received from the service provider instructing the TCU to unlock doors, for example, or receive a preferred roaming list (PRL), which is a list of preferred networks to be used by the TCU when making a connection request. Within the TCU, other information can be updated, such as the phone book, the outgoing call number list used to call the service center, and the like.

During the time periods in which the transceiver is active, the TCU can also receive a maintenance call directly from the service provider. However, before a maintenance call can be received at the TCU, the TCU must detect the start of the maintenance call, and turn its modem on. Once the modem is turned on, data may be received from the service provider instructing the TCU to perform various maintenance tasks.

As described above, during the time periods in which the transceiver is active, the TCU may also transmit an SMS message or a callback sequence to the service provider through the network, instructing the service provider to place a maintenance call. Alternatively, the TCU can also transmit a maintenance call directly to the service provider. However, before a maintenance call can be transmitted from the TCU, the modem in the TCU must be turned on.

Even in the ignition-off mode, when the vehicle is stationary, the connection between the network and the TCU may be poor, because cellular networks are noise limited. For example, if the vehicle is parked at the fringes of the network, the RF parameters in the network change, interference from adjacent channels increases, or the environment surrounding the TCU changes (e.g., a truck has blocked the communication path), data transmissions across the network may not be received properly. When a connection is poor and not all of the information in a data transmission is properly received, the modem in the TCU may remain active and continuously attempt to receive or transmit this information. However, if the connection remains poor and the information is not properly received in a timely manner, the modem may remain on indefinitely. This may be detrimental in the ignition-off mode, when power conservation is important.

Power-saving techniques for turning off modems are known in the art. For example, in data modems not designed for mobile applications, if the modem detects a loss of the carrier tone, the modem immediately turns off, thus saving power. However, in mobile applications, during handoffs between sectors and BSs, the carrier tone will be lost for a brief period of time. If this type of data modem were employed in mobile applications, at every handoff the modem would be turned off and the connection would be dropped, which is an intolerable result.

Similar solutions are known in the art for voice-band data modems. For example, U.S. Pat. No. Re. 34,034, attempts to solve this problem by keeping a voice-band data modem active for a fixed period of time after loss of the voice-band carrier tone, in case the carrier tone quickly resumes, such as in a handoff. If the carrier tone is not detected within the fixed period of time, the modem is then turned off.

CDMA cellular communication systems control the deactivation of the CDMA transceiver, a type of modem, using a frame error rate counter, as established by CDMA system standards. In a CDMA system, data and voice are communicated in 20 ms packets or frames. If frames are not properly received due to a handoff, fading, or other interference, for example, a frame error rate counter increments a count for every frame not properly received. If the counter counts a predetermined number of consecutive bad frames, the modem is turned off and the connection is dropped.

However, in any of the solutions described above, intermittent connection problems that do not result in a loss of carrier tone for the fixed period of time or a loss of a fixed number of consecutive frames may not trigger the deactivation of the modem, resulting in the modem being active for long periods of time and a drain on power budgets. Therefore, a need exists for a method and apparatus for controlling the deactivation of a telecommunications modem, independent of the connection quality, to minimize power consumption.

SUMMARY OF THE INVENTION

Embodiments of the present invention control the deactivation of a telecommunications modem based on the call type, independent of the connection quality, to minimize power consumption. Deactivation, as identified herein, may include turning the modem off, or placing it in a low power consumption state. Embodiments of the present invention are particularly useful in mobile applications when the vehicle's ignition is off and power resources are limited.

TCUs, installed in vehicles such as automobiles, boats, and the like, communicate with base stations/sectors in a cellular communication network to provide telematics functionality for the vehicles. A service provider connected to the TCU through the cellular communication network typically provides this telematics functionality. In one embodiment of the present invention, the service provider sends a message to the TCU, triggering the TCU to initiate a maintenance call to the service provider when the vehicle's ignition is off. Once a connection is established, a call type identifier for identifying the call type is communicated to the TCU within the maintenance call messaging.

The call type identifier is included in the first few frames of data received by the TCU in the maintenance call messaging. For any of the possible call types that the service provider may transmit to the TCU, the TCU will have stored in advance an estimate of how long it should take for any one of those call types to be completed, plus some margin. This estimate is referred to herein as an allowed execution time. Alternatively, the allowed execution time may be generated by the TCU processor upon receipt of the call type identifier, or may be communicated to the TCU along with the call type identifier as part of the data transmission. When a maintenance call for a particular call type is received by the TCU, the TCU will set a call timer to the allowed execution time for that call type. When the allowed execution time has elapsed, the connection will be dropped and the modem will be turned off, regardless of whether the maintenance task was completed.

As noted above, in one embodiment of the present invention, the determination of an allowed execution time is dependent on receiving a call type identifier. As the TCU begins to receive maintenance call messaging, but prior to receiving the call type identifier, the TCU will set the call timer to a default value representing an allowed call type identifier receive time. If the call timer expires and the call type has not yet been identified (i.e. a call type identifier was not received), the connection is dropped and the modem is turned off. The purpose of this default allowed call type identifier receive time is to prevent the TCU's modem from remaining active if a maintenance call connection is established, but a call type identifier is never properly received.

If, however, the call type is identified before the call timer expires, the call timer is reset to the allowed execution time for the identified call type, and the maintenance call continues.

In one embodiment of the present invention, if the allowed execution time elapses and the modem is turned off before the maintenance call data transmission is completed, the service provider can determine the connection was terminated prematurely due to the lack of TCU acknowledgement and send a new message to trigger a new maintenance call at a later time. In further embodiments, the allowed execution times may be updated in the TCU in a maintenance call dedicated to updating the allowed execution times. These two capabilities allow fine-tuning of the allowed execution times and optimization of maintenance call data transmissions.

These and other features and advantages of embodiments of the present invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may reference the CDMA communication protocol (code-based protocols) and the transmission of frames for purposes of explanation only, embodiments of the present invention are applicable to other communication protocols and digital radio technologies generally, and include, but are not limited to, CDMA, AMPS, TDMA, FDMA, GSM, GPRS, and the like.

TCUs, installed in vehicles such as automobiles, boats, and the like, communicate with base stations/sectors in a cellular communication network to provide telematics functionality for the vehicles, which may include, but is not limited to, vehicle tracking and positioning, on-line navigation, emergency "roadside" assistance, remote engine diagnostics, tracking stolen vehicles, entertainment, information services, Internet and e-mail access, automatic emergency transmissions when an accident has occurred, remote door unlocking, telephone and voicemail service, traffic reports, and the like. A service provider connected to the TCU through the cellular communication network typically provides this telematics functionality.

The service provider and the TCU may communicate in an ignition-on mode or an ignition-off mode to provide telematics functionality. In the ignition-on mode, power is typically not an issue due to the recharging of the vehicle's battery that occurs while the ignition is on, and thus the modem in the TCU can be left on the entire time the ignition is on. However, in the ignition-off mode, when maintenance calls may be received by or transmitted from the TCU, TCU power consumption must be considered, especially when the TCU experiences intermittent connection problems that are not severe enough to trigger the deactivation of the modem using conventional modem deactivation schemes. In such situations, the service provider and TCU may try indefinitely to complete the data transmission of a maintenance call, but never do so due to the intermittent errors. The modem will remain on during this indefinite time period, draining the battery. Therefore, embodiments of the present invention control the deactivation of a telecommunications modem based on the call type, independent of the connection quality, to minimize power consumption.

Figure 5:
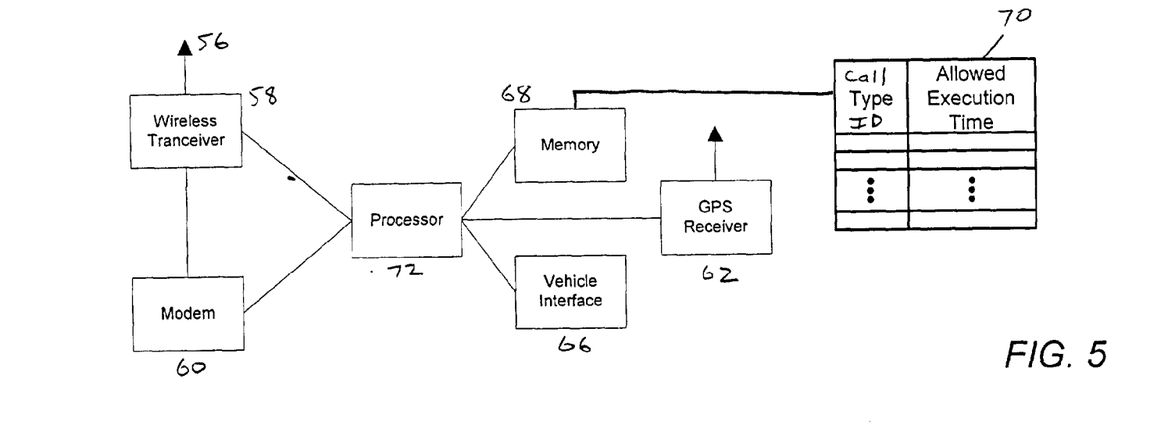
FIG. 5 illustrates a block diagram of an exemplary telematics control unit according to an embodiment of the present invention.

In one embodiment of the present invention, for any of the possible maintenance calls (i.e. call types) that the TCU may perform, the TCU will have stored in advance an estimate of how long it should take for any one of those call types to be completed, plus some margin (i.e. an allowed execution time). Unlike conventional systems, this allowed execution time is not the same for all call types, but rather is dependent on the call type. As illustrated in the example TCU block diagram of FIG. 5, these allowed execution time values may be stored in the memory 68 of the TCU (e.g. in a lookup table 70), and recalled upon receipt of a call type identifier located in the messaging of a maintenance call, or known in advance by the TCU.

In one embodiment of the present invention, the service provider triggers a maintenance call by transmitting an SMS message or callback sequence to the TCU. The TCU responds by initiating a connection request for a maintenance call. At this time, the TCU may not know what type of maintenance call is being requested, it may only know to initiate the connection request. In this embodiment, once the connection is established, the call type identifier will be sent to the TCU from the service provider during the first few frames of the maintenance call messaging. Alternatively, the TCU may already know the maintenance call type at the time the connection request is initiated.

In another embodiment of the present invention, the TCU triggers a maintenance call by transmitting an SMS message or callback sequence to the service provider. The service provider responds by initiating a connection request for a maintenance call. At this time, the service provider may not know what type of maintenance call is being requested, it may only know to initiate the connection request. In this embodiment, at the time the TCU triggers the maintenance call, the TCU may already know the call type identifier. Alternatively, the call type identifier will be sent to the TCU from the service provider during the first few frames of the maintenance call messaging.

Alternatively, the TCU processor, upon receipt or determination of the call type identifier for a maintenance call, may generate the allowed execution time. For example, if call types A, B, C and D have preferred allowed execution times of 1, 3, 3, and 4 seconds, respectively, an execution time unit may be defined as 0.5 seconds, and the call type identifiers may be chosen as 2, 6, 7 and 8, respectively, each call type identifier representing, as closely as possible, the appropriate number of execution time units for that call type. This example is shown in Table 1 below.

TABLE 1

| Call Type | Call Type Identifier | Multiply | Execution Time Unit (sec) | Actual Allowed Execution Time (sec) | Preferred Allowed Execution Time (sec) |
|---|---|---|---|---|---|
| A | 2 | X | 0.5 | 1 | 1 |
| B | 6 | | | 3 | 3 |
| C | 7 | | | 3.5 | 3 |
| D | 8 | | | 4 | 4 |

Upon receipt or determination of the call type identifier, the TCU processor will multiply the call type identifier by the stored execution time unit (0.5 seconds, in this example) to compute the actual allowed execution time. Note that although call types B and C have the same preferred allowed execution time (3 seconds), the call type identifiers must be unique, so that one of the call types (C, in this example), is actually assigned the next higher call type identifier (7, in this example) resulting in an actual allowed execution time of 3.5 seconds. Note that by selecting the execution time unit to be sufficiently small, unique call type identifiers may be assigned for all call types, even though a number of call types have the same preferred allowed execution time, without causing the actual allowed execution time to deviate significantly from the preferred allowed execution times.

In further embodiments, the allowed execution time may be communicated to the TCU along with the call type identifier as part of the maintenance call messaging.

Once the allowed execution time is determined for the received call type, the TCU will set a call timer to the allowed execution time. When the allowed execution time has elapsed, the connection will be dropped and the modem will be turned off, regardless of whether the maintenance function was completed.

Figure 6:
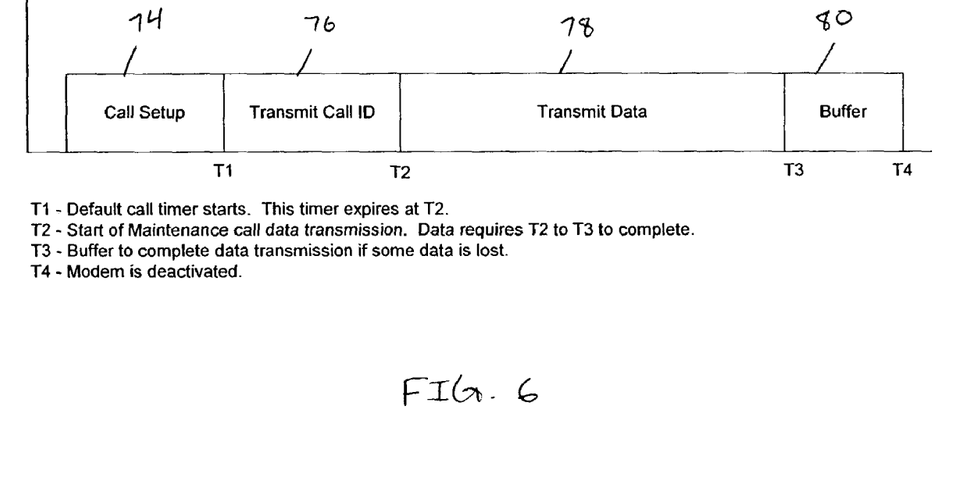
FIG. 6 illustrates a timing diagram of an exemplary maintenance call communication sequence according to an embodiment of the present invention.

As noted above, the determination of a non-default allowed execution time is dependent on receiving or otherwise determining a call type identifier. Referring now to an example maintenance call timeline illustrated in FIG. 6, according to an embodiment of the present invention, after an initial call setup time 74, as the TCU begins to receive maintenance call messaging but prior to receiving the call type identifier, the TCU will set the call timer to a default value at time T1 representing an allowed call type identifier receive time. During the time period indicated at 76, the call type identifier is transmitted. If the call timer expires at time T2 and the call type has not yet been identified (i.e. a call type identifier was not received), the connection is dropped and the modem is turned off. The purpose of this default allowed call type identifier receive time is to prevent the TCU's modem from remaining active if a maintenance call connection is established, but (due to poor connection quality or other transmission failure) a call type identifier is never received. If, however, the call type is identified before the call timer expires, the call timer is reset to the allowed execution time for the identified call type at time T2, and the maintenance call continues. During the time period indicated at 78, the data for the identified call type is transmitted. Although the data transmission should typically only last until time T3, the allowed execution time provides a buffer period 80 in case some data was lost in the initial transmission at 78. However, at time T4, the allowed execution time expires and the modem is deactivated, regardless of whether the data transmission was completed.

Additionally, if one maintenance call is completed before the call timer expires (e.g. between time T3 and T4 in the example of FIG. 6), another maintenance call could be initiated with a new call type, and the call timer would then be reset to the allowed execution time for the new call type.

As described above, CDMA cellular communication systems control the deactivation of the communication link using a frame error rate counter. In embodiments of the present invention, if the frame error rate count is exceeded before the allowed execution time of a maintenance call elapses, the communication link will be dropped, but the modem will remain active until the allowed execution time elapses. By keeping the modem on, the TCU may be able to process a new maintenance call. However, if bad frames are received by the TCU, but not enough to exceed the frame error rate count, the network may detect the loss of these frames via missing acknowledgement messages from the TCU, and retransmit only those bad frames. In addition, if the retransmission of frames takes too long, or is only occasionally successful, the allowed execution time may elapse and the modem will be turned off before the maintenance call data transmission is successfully completed. It should be understood that the present invention includes non-CDMA networks that may also detect bad communications and deactivate the communication link through mechanisms other than a frame error rate counter. In any case, if the service provider determines that the maintenance call was unsuccessful due to incomplete data transactions, a new maintenance call can be initiated.

In one embodiment of the present invention, the allowed execution times or the execution time unit stored in the TCU may be updated via a maintenance call dedicated to updating the allowed execution times, referred to herein as an allowed execution time update maintenance call. This capability allows new call types to be added, discontinued call types to be disregarded, and fine tuning of the allowed execution times.

For example, if a vehicle is usually parked in a subterranean garage or other location of poor reception and retransmission of data is common, the allowed execution times may be insufficient to enable the successful completion of maintenance calls. However, it may be possible to complete these maintenance calls if the allowed execution times are extended. In one embodiment of the present invention, if the service provider determines that the success rate of maintenance calls is unsatisfactorily low by tracking call completion metrics or call timer metrics, the allowed execution times or the execution time unit stored in the TCU may be updated and increased using an allowed execution time update maintenance call. The increased allowed execution times and the expected increase in successful maintenance calls would come at the expense of power consumption, and thus the service provider may track the increased allowed execution times versus the estimated increase in power consumption and the increase in the percentage of successful maintenance calls to select a desired increase in the allowed execution times. Alternatively, if the TCU determines that an unsatisfactory number of maintenance calls are unsuccessful by tracking call completion or call timer metrics, the TCU can unilaterally update and increase the allowed execution times or the execution time unit. The TCU may track the increased allowed execution times versus the estimated increase in power consumption and the increase in the percentage of successful maintenance calls to select a desired increase in the allowed execution times. Alternatively the service provider or the TCU could use the metrics to decrease the allowed execution times to reduce power consumption.

In other embodiments of the present invention, the service provider may detect that TCU connection quality varies according to the time of day, and take those differences into account in assigning allowed execution time values. For example, if a vehicle is usually parked in a subterranean garage during the day (e.g. the parking structure of a large building), but is usually parked in a driveway at night, the service provider or the TCU may determine that maintenance call connections are generally poor during the day (requiring more retransmissions), but improve at night. Thus, the service provider may transmit a different allowed execution time along with a particular maintenance call at different times of the day, or may transmit an allowed execution time update maintenance call to the TCU to update the TCU with several sets of allowed execution times or several execution time units, each set of allowed execution times or each execution time unit corresponding to a particular time interval. Alternatively, the TCU may detect that TCU connection quality varies according to the time of day, and unilaterally create or update these sets of allowed execution times or several execution time units. In such embodiments, when the TCU receives a call type identifier, it will access the set of allowed execution times or the execution time unit appropriate for the time at which the maintenance call was received or at anytime a new call type identifier is received.

In further embodiments of the present invention, the service provider or the TCU may detect that TCU connection quality varies according to location of the vehicle, as identified by GPS data, and take those differences into account in selecting allowed execution time values. For example, if a vehicle is usually parked in a metropolitan area during the day, but is usually parked in a rural area at night, the service provider or TCU may determine that maintenance call connections are generally better in the metropolitan area, and poorer in the rural area. Thus, the service provider may transmit a different allowed execution time along with a particular maintenance call depending on the present location of the vehicle, or may transmit an allowed execution time update maintenance call to update the TCU with several sets of allowed execution times or several execution time units, each set of allowed execution times or execution time unit corresponding to a particular defined geographic area. Alternatively, the TCU may detect that TCU connection quality varies according to location of the vehicle, and unilaterally create or update these sets of allowed execution times or several execution time units. In such embodiments, when the TCU receives a call type identifier, it will access the set of allowed execution times or the execution time unit appropriate for the location of the vehicle at the time the maintenance call was received or at anytime a new call type identifier is received.

In further embodiments of the present invention, the service provider or the TCU may detect that TCU connection quality varies according to network, as identified by either a system identification (SID) or network identification (NID), and take those differences into account in selecting allowed execution time values. For example, depending on the location of the vehicle or the current availability of network resources, the TCU may use different BSs to complete a communication link. Thus, the service provider may transmit a different allowed execution time along with a particular maintenance call depending on the present SID or NID, or may transmit an allowed execution time update maintenance call to update the TCU with several sets of allowed execution times or several execution time units, each set of allowed execution times or execution time unit corresponding to a particular SID or NID. Alternatively, the TCU may detect that TCU connection quality varies according to SID or NID, and unilaterally create or update these sets of allowed execution times or several execution time units. In such embodiments, when the TCU receives a call type identifier, it will access the set of allowed execution times or the execution time unit appropriate for the current SID or NID at the time the maintenance call was received or at anytime a new call type identifier is received.

In further embodiments of the present invention, the service provider or the TCU may detect that TCU connection quality varies according to received signal strength of the wireless interface as detected by the TCU, and take those differences into account in selecting allowed execution time values. For example, depending on the location of the vehicle, the current availability of network resources or the current noise characteristics of the wireless interface the TCU may receive different levels of signal strength from the BS. Information regarding these received signal strengths may be transmitted back to the service provider from the TCU via a pilot strength measurement message (PSMM), for example. Thus, the service provider may transmit a different allowed execution time along with a particular maintenance call depending on the present received signal strength or may transmit an allowed execution time update maintenance call to update the TCU with several sets of allowed execution times or several execution time units, each set of allowed execution times or execution time unit corresponding to a particular received signal strength level. Alternatively, the TCU may detect that TCU connection quality varies according to received signal strength, and unilaterally create or update these sets of allowed execution times or several execution time units. In such embodiments, when the TCU receives a call type identifier, it will access the set of allowed execution times or the execution time unit appropriate for the current received signal strength at the time the maintenance call was received or at anytime a new call type identifier is received.

In further embodiments of the present invention, the service provider or the TCU may detect that TCU connection quality varies according to transmit power of the wireless interface as set by the TCU, and take those differences into account in selecting allowed execution time values. For example, depending on the location of the vehicle, the current availability of network resources or the current noise characteristics of the wireless interface, the TCU may set different levels of transmit power to the BS. Information regarding these transmit power levels may be transmitted back to the service provider from the TCU via a control channel, for example. Thus, the service provider may transmit a different allowed execution time along with a particular maintenance call depending on the present received signal strength or may transmit an allowed execution time update maintenance call to update the TCU with several sets of allowed execution times or several execution time units, each set of allowed execution times or execution time unit corresponding to a particular transmit power level. Alternatively, the TCU may detect that TCU connection quality varies according to transmit power levels, and unilaterally create or update these sets of allowed execution times or several execution time units. In such embodiments, when the TCU receives a call type identifier, it will access the set of allowed execution times or the execution time unit appropriate for the transmit power level at the time the maintenance call was received or at anytime a new call type identifier is received.

Although the modem deactivation control concepts described hereinabove used a cellular network as an example, the basic concept of modem deactivation control is applicable to or may be extended to other wireless protocols and technologies such as paging systems, satellite communication systems, cordless phone systems, fleet communication systems, and the like, wherein retransmissions of poor calls may result in modems being active for an excessive time, and excessive power consumption. The concept of a BS/sector described herein encompasses repeaters or different antenna diversity schemes, a cordless base, a satellite or another telephone, and the like. The concept of a TCU described herein encompasses a cellular telephone, a pager, a satellite phone, a cordless phone, a fleet radio, a wireless terminal device, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a service provider, a telematics control unit (TCU), and a telecommunications network for enabling communications between the service provider and the TCU, the TCU including a modem capable of being activated for processing a maintenance call, a method for controlling a deactivation of the modem after a start of the processing of the maintenance call, the method comprising:
   connecting the modem to a TCU transceiver for transmitting data, not voice, to the service provider;
   determining a call type identifier from the maintenance call for identifying a call type of the maintenance call;
   utilizing a timer to count an allowed execution time specific to the identified call type after the start of the processing of the maintenance call; and
   deactivating the modem after the timer counts the allowed execution time and the allowed execution time has elapsed, regardless of whether the processing of the maintenance call has been completed.

2. The method as recited in claim 1, further including determining the allowed execution time specific to the identified call type by using the call type identifier as an index to a lookup table of allowed execution times.

3. The method as recited in claim 2, further including updating the lookup table of allowed execution times by processing an allowed execution time update maintenance call.

4. The method as recited in claim 3, the step of updating the lookup table of allowed execution times comprising increasing the allowed execution times in the lookup table if a percentage of maintenance calls that are successfully completed before the allowed execution time for the maintenance calls elapses is below a predetermined threshold.

5. The method as recited in claim 1, further including determining the allowed execution time specific to the identified call type by multiplying the call type identifier by an execution time unit.

6. The method as recited in claim 5, further including updating the execution time unit by processing an allowed execution time update maintenance call.

7. The method as recited in claim 6, the step of updating the execution time unit comprising increasing the execution time unit if a percentage of maintenance calls that are successfully completed before the allowed execution time for the maintenance calls elapses is below a predetermined threshold.

8. The method as recited in claim 1, further including receiving the allowed execution time along with the call type identifier in the maintenance call.

9. The method as recited in claim 8, further including determining the allowed execution time in accordance with a current time of day.

10. The method as recited in claim 8, further including determining the allowed execution time in accordance with a current location of the TCU.

11. The method as recited in claim 8, further including determining the allowed execution time in accordance with the telecommunications network currently being used for communications.

12. The method as recited in claim 8, further including determining the allowed execution time in accordance with a received signal strength measured by the TCU.

13. The method as recited in claim 8, further including determining the allowed execution time in accordance with a transmit power of the TCU.

14. The method as recited in claim 1, further including:
   waiting an allowed call type identifier receive time upon detecting the start of the processing of the maintenance call; and
   deactivating the modem if the allowed call type identifier receive time elapses before the call type identifier is determined.

15. The method as recited in claim 1, wherein if the maintenance call is not successfully completed before the allowed execution time for the maintenance call elapses, the method further includes restarting the processing of the maintenance call after waiting a predetermined period of time after the elapse of the allowed execution time.

16. The method as recited in claim 1, further including determining the allowed execution time specific to the identified call type by using the call type identifier and a current time of day as an index to a set of lookup tables of allowed execution times, each lookup table corresponding to a particular time of day period.

17. The method as recited in claim 1, further including determining the allowed execution time specific to the identified call type by multiplying the call type identifier by an execution time unit specific to a current time of day.

18. The method as recited in claim 1, further including determining the allowed execution time specific to the identified call type by using the call type identifier and a current location of the TCU as an index to a set of lookup tables of allowed execution times, each lookup table corresponding to a particular geographic area.

19. The method as recited in claim 1, further including determining the allowed execution time specific to the identified call type by multiplying the call type identifier by an execution time unit specific to a geographic area encompassing a current location of the TCU.

20. The method as recited in claim 1, further including determining the allowed execution time specific to the identified call type by using the call type identifier and the telecommunications network currently being used for communications as an index to a set of lookup tables of allowed execution times, each lookup table corresponding to a particular telecommunications network.

21. The method as recited in claim 1, further including determining the allowed execution time specific to the identified call type by multiplying the call type identifier by an execution time unit specific to the telecommunications network currently being used for communications.

22. The method as recited in claim 1, further including determining the allowed execution time specific to the identified call type by using the call type identifier and a received signal strength measured by the TCU as an index to a set of lookup tables of allowed execution times, each lookup table corresponding to a particular received signal strength range.

23. The method as recited in claim 1, further including determining the allowed execution time specific to the identified call type by multiplying the call type identifier by an execution time unit specific to a received signal strength measured by the TCU.

24. The method as recited in claim 1, further including determining the allowed execution time specific to the identified call type by using the call type identifier and a transmit power of the TCU as an index to a set of lookup tables of allowed execution times, each lookup table corresponding to a particular transmit power range.

25. The method as recited in claim 1, further including determining the allowed execution time specific to the identified call type by multiplying the call type identifier by an execution time unit specific to a transmit power of the TCU.

26. A telematics control unit (TCU) for communicating with a service provider through a telecommunications network, comprising:
   a modem capable of being activated for processing a maintenance call; and
   a TCU processor programmed for
      connecting the modem to a TCU transceiver for transmitting data, not voice, to the service provider,
      determining a call type identifier from the maintenance call for identifying a call type of the maintenance call,
      utilizing a timer to count an allowed execution time specific to the identified call type after a start of the processing of the maintenance call, and
      deactivating the modem after the timer counts the allowed execution time and the allowed execution time has elapsed, regardless of whether the processing of the maintenance call has been completed.

27. The TCU as recited in claim 26, wherein the TCU processor is further programmed for determining the allowed execution time specific to the identified call type by using the call type identifier as an index to a lookup table of allowed execution times.

28. The TCU as recited in claim 27, wherein the TCU processor is further programmed for updating the lookup table of allowed execution times by receiving and processing an allowed execution time update maintenance call.

29. The TCU as recited in claim 28, wherein the TCU processor is further programmed for increasing the allowed execution times in the lookup table if a percentage of maintenance calls that are successfully completed before the allowed execution time for the maintenance calls elapses is below a predetermined threshold.

30. The TCU as recited in claim 26, wherein the TCU processor is further programmed for determining the allowed execution time specific to the identified call type by multiplying the call type identifier by an execution time unit.

31. The TCU as recited in claim 30, wherein the TCU processor is further programmed for updating the execution time unit by receiving and processing an allowed execution time update maintenance call.

32. The TCU as recited in claim 31, wherein the TCU processor is further programmed for increasing the execution time unit if a percentage of maintenance calls that are successfully completed before the allowed execution time for the maintenance calls elapses is below a predetermined threshold.

33. The TCU as recited in claim 26, wherein the TCU processor is further programmed for receiving the allowed execution time along with the call type identifier in the maintenance call.

34. The TCU as recited in claim 26, wherein the TCU processor is further programmed for:
   waiting an allowed call type identifier receive time upon detecting the start of the processing of the maintenance call; and
   deactivating the modem if the allowed call type identifier receive time elapses before the call type identifier is determined.

35. The TCU as recited in claim 26, wherein, if the maintenance call is not successfully completed before the allowed execution time for the maintenance call elapses, the TCU processor is further programmed for restarting the processing of the maintenance call after waiting a predetermined period of time after the elapse of the allowed execution time.

36. The TCU as recited in claim 26, wherein the TCU processor is further programmed for determining the allowed execution time specific to the identified call type by using the call type identifier and a current time of day as an index to a set of lookup tables of allowed execution times, each lookup table corresponding to a particular time of day period.

37. The TCU as recited in claim 26, wherein the TCU processor is further programmed for determining the allowed execution time specific to the identified call type by multiplying the call type identifier by an execution time unit specific to a current time of day period.

38. The TCU as recited in claim 26, wherein the TCU processor is further programmed for determining the allowed execution time specific to the identified call type by using the call type identifier and a current location of the TCU as an index to a set of lookup tables of allowed execution times, each lookup table corresponding to a particular geographic area.

39. The TCU as recited in claim 26, wherein the TCU processor is further programmed for determining the allowed execution time specific to the identified call type by multiplying the call type identifier by an execution time unit specific to a geographic area encompassing a current location of the TCU.

40. The TCU as recited in claim 26, wherein the TCU is further programmed for determining the allowed execution time specific to the identified call type by using the call type identifier and the telecommunications network currently being used by the TCU as an index to a set of lookup tables of allowed execution times, each lookup table corresponding to a particular telecommunications network.

41. The TCU as recited in claim 26, wherein the TCU processor is further programmed for determining the allowed execution time specific to the identified call type by multiplying the call type identifier by an execution time unit specific to the telecommunications network currently being used by the TCU.

42. The TCU as recited in claim 26, wherein the TCU is further programmed for determining the allowed execution time specific to the identified call type by using the call type identifier and a received signal strength measured by the TCU as an index to a set of lookup tables of allowed execution times, each lookup table corresponding to a particular received signal strength range.

43. The TCU as recited in claim 26, wherein the TCU processor is further programmed for determining the allowed execution time specific to the identified call type by multiplying the call type identifier by an execution time unit specific to a received signal strength measured by the TCU.

44. The TCU as recited in claim 26, wherein the TCU processor is further programmed for determining the allowed execution time specific to the identified call type by using the call type identifier and a transmit power of the TCU as an index to a set of lookup tables of allowed execution times, each lookup table corresponding to a particular transmit power range.

45. The TCU as recited in claim 26, wherein the TCU processor is further programmed for determining the allowed execution time specific to the identified call type by multiplying the call type identifier by an execution time unit specific to a transmit power of the TCU.

46. A telematics service system for processing maintenance calls in cooperation with a telematics control unit (TCU) through a telecommunications network, the TCU comprising a modem capable of being activated for receiving a maintenance call including a call type identifier for determining an allowed execution time specific to a call type of the maintenance call and controlling a deactivation of the modem after receiving the maintenance call, the telematics service system for assisting in controlling the deactivation of the modem, the telematics service system comprising:
  a telematics service system processor programmed for transmitting a maintenance call including a call type identifier for identifying the call type of the maintenance call.

47. The telematics service system as recited in claim 46, wherein the telematics service system processor is further programmed for transmitting the allowed execution time along with the call type identifier in the maintenance call.

48. The telematics service system as recited in claim 47, wherein the telematics service system processor is further programmed for determining the allowed execution time transmitted along with the call type identifier in the maintenance call in accordance with a time of day that the maintenance call is transmitted.

49. The telematics service system as recited in claim 47, wherein the telematics service system processor is further programmed for determining the allowed execution time transmitted along with the call type identifier in the maintenance call in accordance with a location of the TCU at the time the maintenance call is transmitted.

50. The telematics service system as recited in claim 47, wherein the telematics service system processor is further programmed for determining the allowed execution time transmitted along with the call type identifier in the maintenance call in accordance with the telecommunications network used by the telematics service system at the time the maintenance call is transmitted.

51. The telematics service system as recited in claim 47, wherein the telematics service system processor is further programmed for determining the allowed execution time transmitted along with the call type identifier in the maintenance call in accordance with a received signal strength measured by the TCU.

52. The telematics service system as recited in claim 47, wherein the telematics service system processor is further programmed for determining the allowed execution time transmitted along with the call type identifier in the maintenance call in accordance with a transmit power of the TCU.

53. The telematics service system as recited in claim 46, wherein the telematics service system processor is further programmed such that if the maintenance call is not successfully completed before the allowed execution time elapses, the maintenance call is retransmitted to the TCU after waiting a predetermined period of time after the elapse of the allowed execution time.

54. The telematics service system as recited in claim 46, wherein the telematics service system processor is further programmed for transmitting an allowed execution time update maintenance call to the TCU for updating a lookup table of allowed execution times.

55. The telematics service system as recited in claim 54, wherein the allowed execution time update maintenance call increases the allowed execution times in the lookup table if a percentage of maintenance calls that are successfully completed before the allowed execution time for the maintenance calls elapses is below a predetermined threshold.

56. The telematics service system as recited in claim 46, wherein the telematics service system processor is further programmed for transmitting an allowed execution time update maintenance call to the TCU for updating an execution time unit.

57. The telematics service system as recited in claim 56, wherein the allowed execution time update maintenance call increases the execution time unit if a percentage of maintenance calls that are successfully completed before the allowed execution time elapses is below a predetermined threshold.

* * * * *